Nov. 10, 1959 J. C. WAGNER 2,912,057
MOTOR VEHICLE TILTABLE CAB AND RADIATOR CONSTRUCTION
Filed March 14, 1958 3 Sheets-Sheet 1
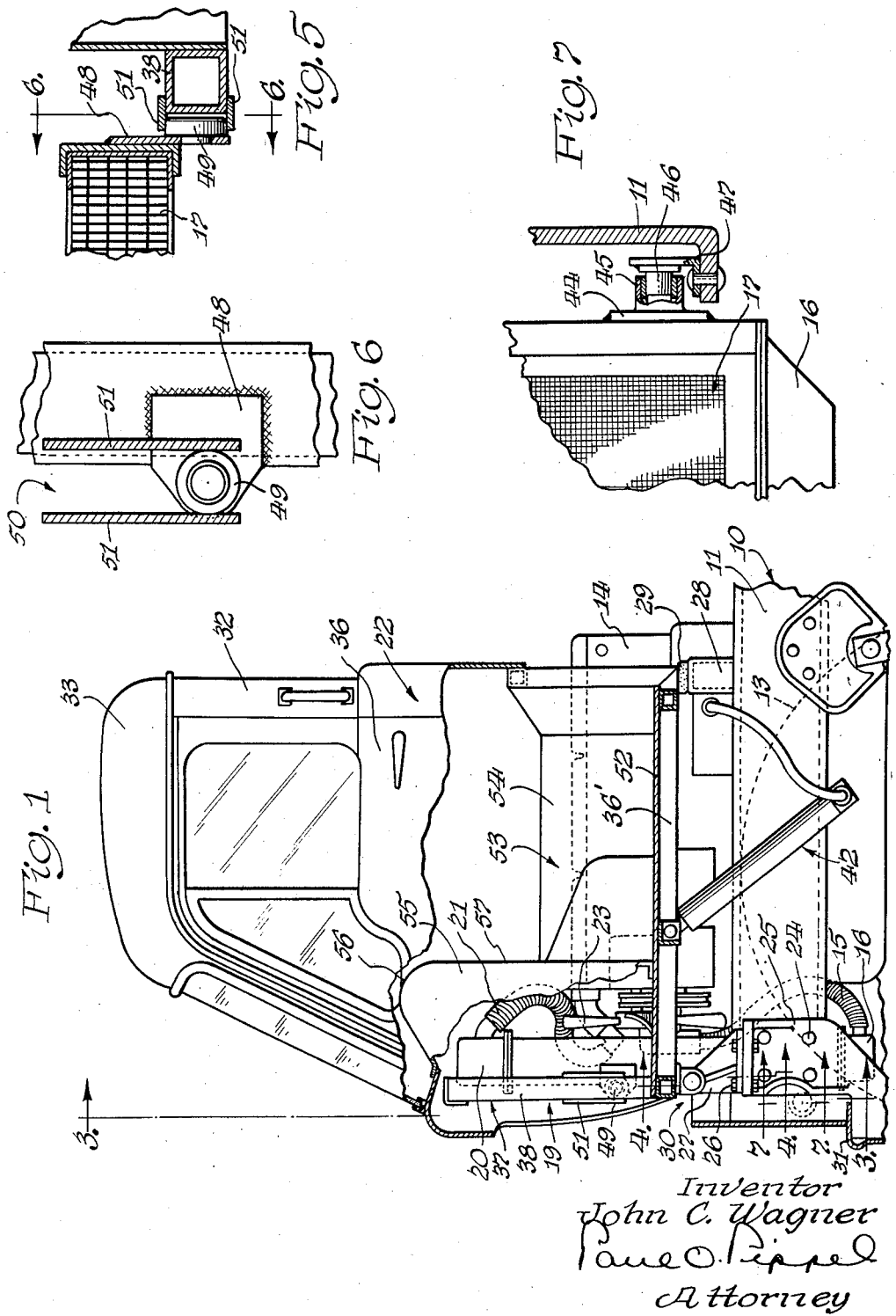
Inventor
John C. Wagner
Paul O. Pippel
Attorney

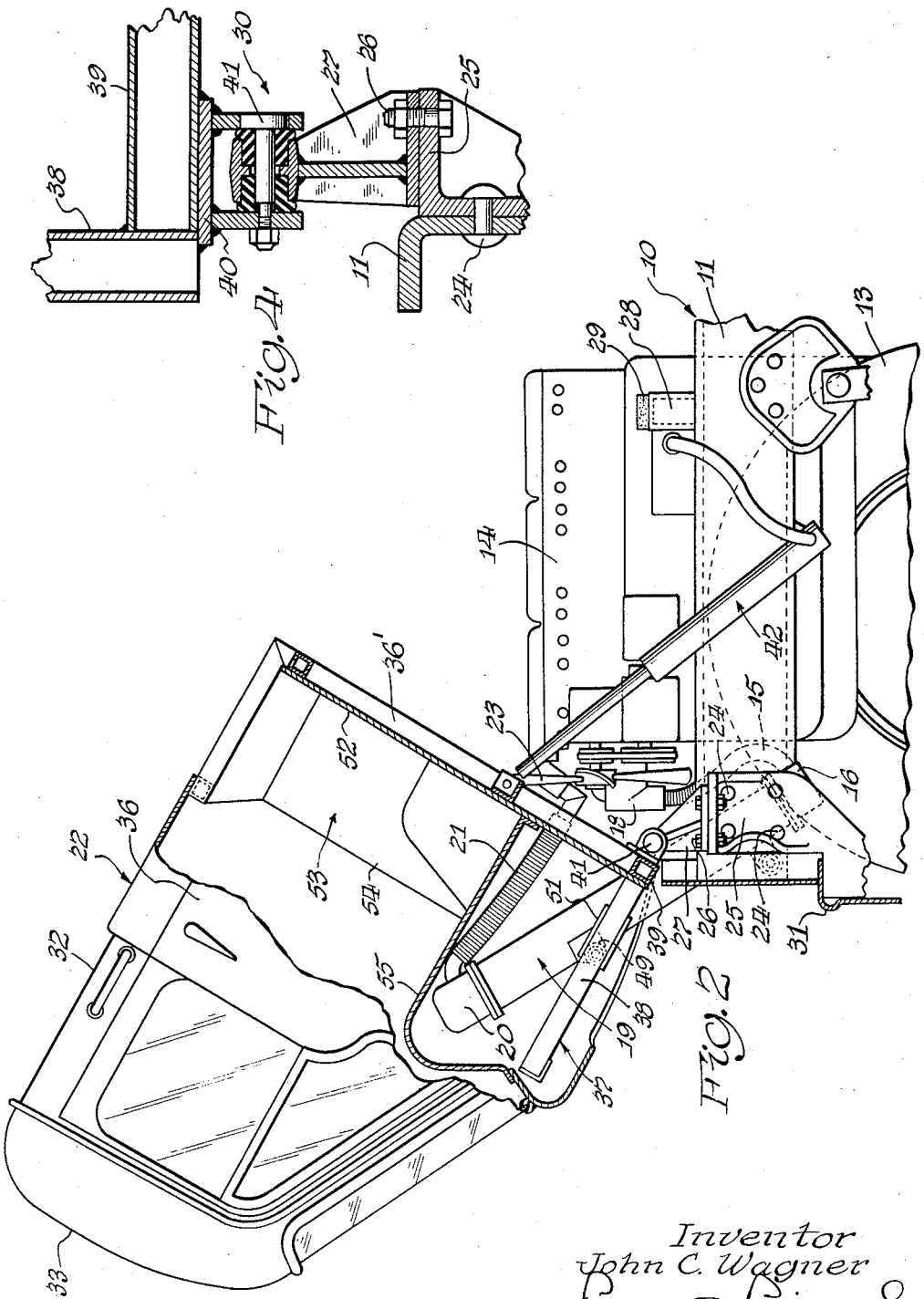

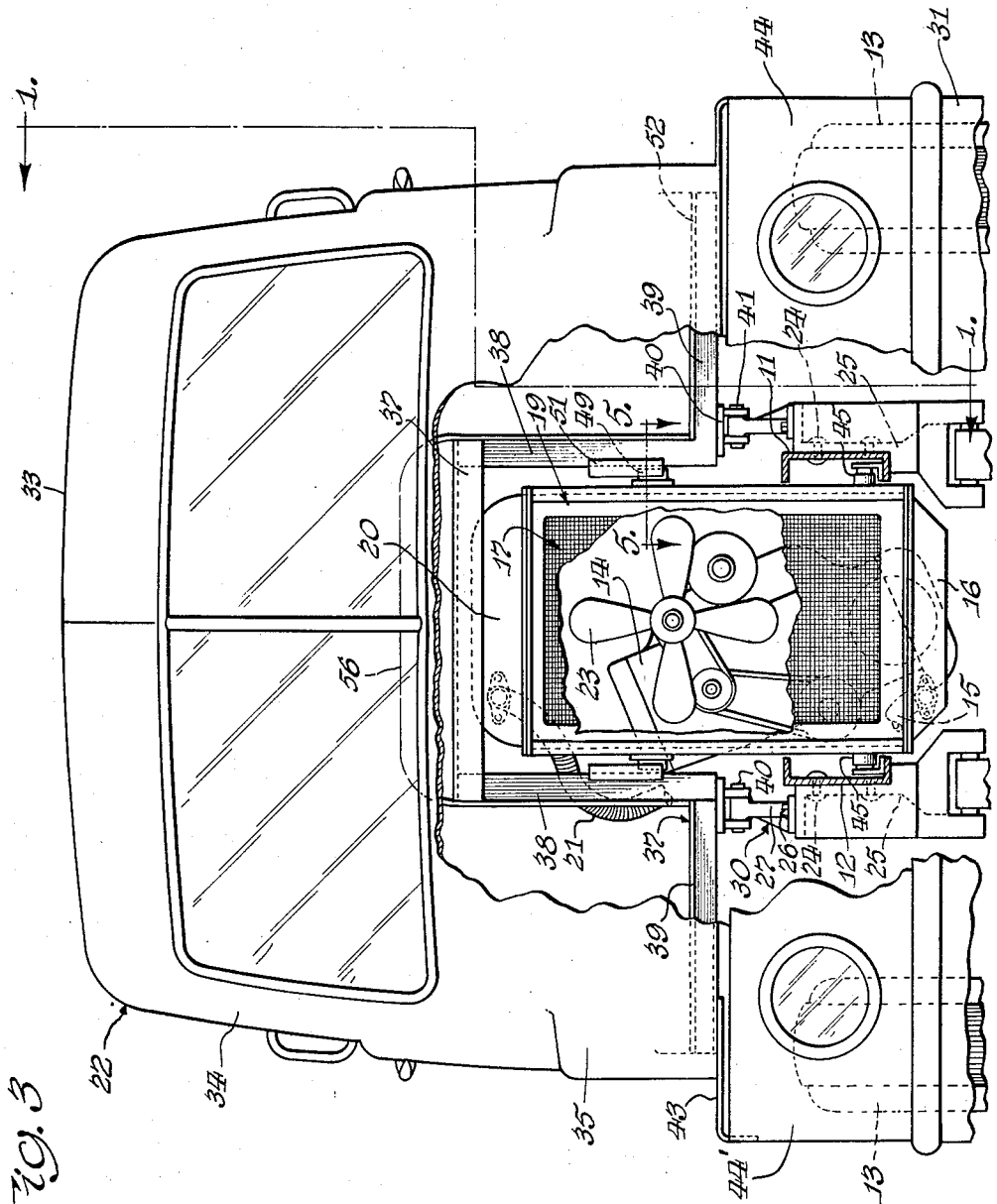

United States Patent Office 2,912,057
Patented Nov. 10, 1959

2,912,057

MOTOR VEHICLE TILTABLE CAB AND RADIATOR CONSTRUCTION

John C. Wagner, El Cerrito, Calif., assignor to International Harvester Company, Chicago, Ill., a corporation of New Jersey Application March 14, 1958, Serial No. 721,470

12 Claims. (Cl. 180—68)

This invention relates to a new and improved motor vehicle construction and more particularly to motor trucks of the cab-over-engine type.

In the majority of cab-over-engine motor vehicles the general plane of the cab floor is spaced below the top of the engine and its accessories such as the engine cooling system radiator and fan to permit easy ingress to and egress from the cab. Obviously by lowering the cap floor in such a manner the upper portion of the engine and the accessories must, of necessity, project into the interior of the operator's compartment. The engine and appurtenances projecting above the level of the cab floor are generally enclosed by an engine enclosure commonly called a "dog house." The foremost objection to this method of solving the problem of providing a low level cab floor has been that the vehicle operator's comfort is impaired by the protrusion of the engine housing above the general level of the cab floor. In conventional engine installations the engine heat exchanger radiator is generally mounted forwardly of the engine and in line therewith since it has been determined that by mounting the radiator in this manner it is in a position where it is exposed to the air draft created by movement of the vehicle which air draft assists the draft created by the engine driven cooling fan to assure adequate and efficient cooling of the engine coolant and engine per se during operation of the vehicle in all atmospheric conditions. The dimensions of the radiator generally are such that the top thereof is spaced above the top of the engine and other parts thereof. As a result the engine enclosure portion covering the supper part of the radiator in cab-over-engine vehicles is quite large. In conventional forwardly tilting cab-over-engine motor trucks wherein the radiator is mounted forwardly of the engine, the engine housing section covering the radiator is made considerably larger than it has to be to merely cover the radiator when the cab is in its normal lowered position because of the fact that as the cab is raised and the engine housing is swung relatively to the radiator adequate clearance between the top of the radiator and the engine closure must be provided to prevent interference therebetween. Thus in conventional forwardly tilting vehicles having a conventional mounted radiator, the engine enclosure section designed to cover the radiator is made very much larger than is necessary to cover the radiator when the vehicle cab is in its lowered position to accommodate swinging movement of the cab without interference between relatively moving parts of the cab and the radiator. Obviously the operator's comfort is greatly impaired and the interior of the cab is rendered less commodious by the large protrusion of the engine housing section covering the radiator. It is therefore the primary objective of the present invention to support the engine coolant heat exchanger or radiator in such a manner that the size of the engine housing section covering the radiator when the vehicle cab is in its lowered position is maintained at a minimum.

A further object is to pivotally support the radiator of a forwardly tilting cab-over-engine motor vehicle on the chassis frame whereby the radiator tilts with respect to the chassis frame and the vehicle cab as the vehicle cab is tilted forwardly from its normally lowered position to its forwardly raised position.

Still another object is to reduce the size of the engine enclosure protrusion within the cab of a forwardly tilting C.O.E. type vehicle to afford a commodious cab interior;

A further object is the improved mounting of the engine radiator of a forwardly tilting C.O.E. type vehicle which enables this unit to occupy the minimum space, without cramping and decrease in cooling efficiency, and makes available the maximum possible seating and floor space in the operator's compartment which is accomplished using existing and orthodox engines and accessories;

The foregoing and other important objects and desirable features inherent in and encompassed by the invention together with many of the purposes and uses thereof will become readily apparent from a reading of the ensuing description in conjunction with the annexed drawings in which:

Figure 1 is a side elevational view of the forward end of a tilt cab type C.O.E. motor truck embodying the invention; the cab is shown in its lowered or engine enclosing position and portions thereof are broken away and in section to better illustrate the invention;

Figure 2 is a side elevational view similar to Figure 1 with the exception of the operator's compartment or cab is shown in its raised or forwardly tilted position;

Figure 3 is a sectional view taken substantially along line 3—3 of Figure 1;

Figure 4 is a detailed sectional view of a hinge connection of the cab to the chassis frame taken substantially along line 4—4 of Figure 1;

Figure 5 is a horizontal sectional view taken substantially along line 5—5 of Figure 3;

Figure 6 is a sectional view taken along line 6—6 of Figure 5; and

Figure 7 is an enlarged vertical sectional view taken substantially along the line 7—7 of Figure 1.

Referring to the drawings in detail, wherein like reference characters represent like elements throughout the various views, there is shown the forward portion of a motor truck chassis frame 10 which includes a pair of transversely spaced longitudinally extending channel-shaped side sill members 11 and 12 which are interconnected by transversely extending longitudinally spaced cross members, not shown.

The rearwardly disposed end of the chassis frame 10 is supported off the ground by power-driven ground-engaging wheels, not shown, which are resiliently connected thereto by springs, not shown, in a conventional manner. It is to be understood that non-essential details not material to practice the invention have been eliminated and are not shown in order to clearly illustrate the invention. The forward end of the chassis frame 10 is supported by means of steerable ground-engaging wheels 13, partially shown in Figures 1, 2 and 3.

The vehicle power plant or engine, designated generally by numeral 14, is resiliently mounted in a suitable manner adjacent the forward end of the chassis frame 10 and centrally thereof. Suitable power transmission means, not shown, such as change-speed transmission mechanism, differential gearing etc., are employed to drivingly interconnect the engine 14 and the rear ground-engaging wheels. The engine 14 is of any conventional multi-cylinder water cooled type. Cooling water is supplied to the engine 14 through a conduit 15 interconnecting the lower header 16 of a radiator core 17 and the suction side of a circulating water pump 18. The radiator structure, designated generally by numeral 19, also includes an upper header 20 which has one end of a flexible and extensible coolant return conduit 21 connected thereto. The opposite end of the conduit 21 is secured to the upper forward portion of the engine 14 in a conventional manner. It will be noted that the radiator structure 19 is positioned forwardly of the engine 14 and substantially in longitudinal alignment with the engine as in conventional installations to obtain the maximum cooling efficiency of the radiator structure 19 without the need for complicated and costly duct work. It will also be noted that the radiator structure 19 is disposed in a vertical plane containing the forwardmost terminal end of the chassis frame 10. When the operator's compartment, designated generally by the numeral 22, is in its normal lowered position, as shown in Figure 1, cooling air is drawn through the radiator structure 19 and around the engine 14 by an engine driven fan 23 longitudinally spaced intermediate the engine 14 and the radiator structure 19.

Attached to the extreme forward end of each side sill members 11 and 12 by a suitable fastening means 24 is a bracket 25. Fastened to the top surface of each bracket 25 by means of bolts 26 is a cab trunnion or hinge element 27. A channel shaped upright member 28 rearwardly spaced from a respective hinge element 27 is fastened to the top flange of each side sill member 11 and 12. The uppermost end of each member 28 is provided with a pad 29 of resilient material such as rubber or the like for a purpose which will be explained hereinafter. The upright members 28 and the hinge elements 27 of each cab hinge connection 30 serve as the means for supporting the vehicle cab operator's compartment 22 on the chassis frame 10. The front bumper 31, partially shown in Figures 1, 2 and 3, is adapted to abut the forwardmost walls of the brackets 25 and is suitably secured thereto.

The operator's compartment 22 includes a back panel 32 joined to a roof 33 which, in turn, is connected to a windshield frame 34. The windshield frame 34 is integrally formed with a depending front panel 35. A pair of doors 36 are pivotally mounted to door pillar posts, not shown, adjacent the transverse edges of the front panel 35.

The vehicle cab frame, which is utilized to interconnect the various body parts enumerated above to increase the strength and rigidity of the assembled operator's compartment 22 in addition to suitable braces and ribs, not shown, includes a pair of longitudinally extending, transversely spaced members 36' having a box-like section. Rigidly secured to the forwardmost ends of the members 36' is an inverted U-shaped structure 37 which includes a pair of transversely spaced upright members 38. Extending transversely outwardly from the lowermost ends of the upright members 38 and the forwardmost ends of the longitudinally extending cab frame members 36 are outriggers 39.

Secured to the underside of the cab frame adjacent the intersection of each outrigger 39 and a respective upright member 38 is a bifurcated cab hinge element 40. Pivot pins 41 are carried by the bifurcations of the hinge elements 40 and are employed to pivotally connect the hinge elements 40 to the hinge elements 27, as illustrated in Figure 4. From the foregoing it will be appreciated that the operator's compartment 22 is capable of pivoting with respect to the chassis frame 10 about a transversely extending horizontal axis from the position shown in Figure 1 to the position shown in Figure 2. Link means (not shown) are provided to limit the swing of the operator's compartment 22 to the position shown in Figure 2.

Normally the operator's compartment 22 is in the position shown in Figure 1 wherein the front end thereof is supported by the chassis frame 10 through the intermediary of the hinge members 27 and the rear end thereof is supported by the chassis frame 10 through the intermediary of the upright members 28 and the resilient pads 29. Suitable latch means (not shown) are provided for latching the operator's compartment 22 to the chassis frame 10 when the operator's compartment is in its normal position shown in Figure 1. When the latch mechanism is released the cab is free to be swung forwardly about the pivotal axis defined by the pivot pins 41 interconnecting each pair of hinge members 27, 40. Power actuated means in the form of a hydraulic piston and cylinder unit 42 having one end pivotally connected to the underside of the vehicle operator's compartment 22 and its opposite end pivotally connected to the chassis frame 10 is utilized to provide the effort required to swing the operator's compartment forwardly from its normally lowered position.

Running the length of the operator's compartment 22 along the lower edge of each side thereof is a fender section 43, each of which cooperates with a transversely extending panel 44' to form a fender or wheel covering for one of the steerable wheels 13. The panels 44' are fixed to the chassis frame 10 in a suitable manner.

As best shown in Figure 7, a plate-like bracket 44 secured as by welding or the like to the radiator core 17 extends forwardly from each side of the radiator core. Each bracket 44 is provided with a cylindrical bearing section 45 in which a pivot pin 46 is rotatably journalled. Each pivot pin 46 is carried by an L-shaped bracket fixed to the lower flange portion of a respective side sill member 11, 12. From the foregoing it will be appreciated that the engine radiator structure 19 is supported on the chassis frame 10 for pivotal movement about a transverse horizontal axis through the pivot pins 46 which is vertically spaced below the pivotal axis of the operator's compartment 22 as shown in Figure 1. Fastened to each side of the radiator core 17 intermediate the top and bottom thereof is a tab 48 which rotatably supports a roller 49 as illustrated in Figures 5 and 6. Each roller 49 is disposed in a guide or stabilizer track 50 formed by a pair of spaced and parallel elongated plates 51 rigidly secured to a respective vertical cab frame member 38. From the foregoing it will be appreciated that the lower end of the radiator structure 19 is pivotally connected to the chassis frame 10 and is capable of swinging vertically with respect thereto about a transversely extending horizontal axis vertically spaced below the pivotal axis of the operator's compartment 22. The portion of the radiator structure 19 vertically above the pivotal axis of the operator's compartment 22 is connected to the operator's compartment 22 whereby the radiator structure 19 can move vertically as well as pivot with respect to the operator's compartment 22. The importance and purpose for mounting the radiator structure 19 as described above will be pointed out hereinafter.

From the foregoing it will be obvious that the entire weight of the radiator structure 19 is transmitted to the chassis frame 10 through the pivot pins 46 and the connections of the radiator structure 19 described above to the operator's compartment 22 maintains or stabilizes the radiator structure in an upright position when the operator's compartment 22 is in its normal lowered position as shown in Figure 1.

Secured to the lowermost horizontally disposed cab frame member is a flat platform 52 which serves as the operator's compartment floor. The central portion of the floor 52 is interrupted by a longitudinally extending hood structure, designated generally by numeral 53, which has its forward end fastened to the U-shaped structure 37 of the cab frame and its readwardmost end is similarly secured to the cab frame at the back panel 32 of the operator's compartment 22. The hood structure 53 includes a relatively long section 54 of relatively short height above the floor 52 which covers and extends over the major portion of the engine 14 protruding above the level of the floor 52. The hood structure 53 also includes a relatively short section 55 at the forward end of the operator's compartment 22 which covers the radiator structure 19, as illustrated in Figures 1 and 3. The surface indicated by numeral 56 of the section 55 serves as a mounting panel for the fuel gage, speedometer and other indicating instruments of the vehicle, not shown, which are conveniently viewable by the vehicle operator when the vehicle is in operation.

In operation, when it is desired to raise the operator's compartment 22 the piston and cylinder assembly 42 is expanded after the cab latch means is released. During the pivotal movement of the operator's compartment 22 about the pivot pins 41 from the position shown in Figure 1 to the position shown in Figure 2, the radiator structure 19 pivots about pivot pins 46 relative to the chassis frame 10 and the rollers 49 simultaneously slide vertically in the tracks 51 relative to the upright members 38 and simultaneously the operator's compartment 39 pivots with respect to the U-shaped structure 37. It is believed obvious that by mounting the radiator structure 19 such that it pivots with respect to the chassis frame 10 when the operator's compartment 22 is pivoted, the longitudinal dimension of the section 55 having the greatest vertical dimension of the hood structure 53 is kept at a minimum. As an example, if the radiator structure 19 was relatively fixed to the chassis frame 10, it s believed clear that the rearwardly facing wall 57 of the section 55 would have to be spaced substantially rearwardly of the position shown in Figure 1 to accommodate tilting of the operator's compartment 22 without interference of the hood structure with the top of the radiator structure 19. Thus by mounting the radiator structure in the manner pointed out hereinbefore, the spacing between the wall 57 of the hood structure 54 in the front panel 35 is kept at a minimum.

The embodiment of the invention chosen for the purposes of illustration and description herein is that preferred for achieving the objects of the invention and developing the utility thereof in a most desirable manner, due regard being had to existing factors of economy, simplicity of design and construction and the improvements sought to be effected. It will be appreciated therefore that the particular structural and functional aspects emphasized herein are not intended to exclude, but rather to suggest, such other adaptations and modifications of the invention as fall within the spirit and scope of the invention as defined in the appended claims.

What is claimed is:

1. In a motor vehicle having a chassis frame, an engine mounted on the forward end of said frame, and an operator's compartment mounted on said frame for pivotal movement about a transversely extending horizontal axis between a normally lowered position and a forwardly raised position; a radiator structure for said engine disposed forwardly thereof; means for pivotally connecting said radiator to said chassis frame; and means operatively connecting said radiator to said operator's compartment whereby pivotal movement of said operator's compartment effects relative pivotal movement of said radiator structure with respect to said chassis frame and said operator's compartment.

2. In a motor vehicle having a longitudinally extending chassis frame, an engine mounted on the forward end of said chassis frame, and an operator's compartment mounted on the forward end of said chassis frame for pivotal movement about a transversely extending axis between a normally lowered engine covering position and a raised forwardly tilted position, the combination including said chassis frame, engine and said operator's compartment, comprising, a radiator structure for said engine; means for pivotally connecting said radiator structure to said chassis frame forwardly of said engine for pivotal movement with respect to said chassis frame between a normally upright position and a forwardly inclined position; means operatively interconnecting said operator's compartment and said radiator structure whereby pivotal movement of said operator's compartment effects simultaneous pivotal movement of said radiator structure with respect to said chassis frame and said operator's compartment.

3. In a motor vehicle having a longitudinally extending chassis frame, and an operator's compartment mounted on said chassis frame for pivotal movement about a transversely extending horizontal axis between a normally lowered position and a forwardly tilted position, the combination comprising said chassis frame and said operator's compartment, including, a radiator structure; means for pivotally connecting said radiator structure to said chassis frame for pivotal movement with respect to said chassis frame between a normally upright position and a forwardly inclined position; and means for operatively interconnecting said operator's compartment and said radiator structure including a guide track element and a roller element engaging said guide track element for sliding movement with respect thereto, one of said elements being carried by said operator's compartment and the other element being carried by said radiator structure whereby pivotal movement of said operator's compartment between its normally lowered position and its forwardly tilted position effects simultaneous pivotal movement of said radiator structure with respect to said chassis frame and said operator's compartment between its normally upright position and its forwardly inclined position.

4. In a motor vehicle having a longitudinally extending chassis frame, an engine mounted on one end of said frame, and an operator's compartment mounted on said chassis frame for pivotal movement about a transversely extending axis between a normally lowered position where it overlies said engine and a raised forwardly titled position, the combination including said chassis frame, engine and said operator's compartment, comprising, a substantially rectangular radiator structure having a cylindrical rotatably mounted roller projecting transversely outwardly from each transverse side thereof; means for pivotally connecting the radiator structure to said chassis frame for pivotal movement between a normally upright position and a forwardly inclined position; and a pair of transversely spaced guide tracks fixed to said operator's compartment, each of said guide tracks slidingly receiving a respective roller and being vertically disposed when said operator's compartment is in its normal lowered position.

5. In a motor vehicle substantially as set forth in claim 4, in which, said guide tracks are vertically spaced above the pivotal axis of said operator's compartment and said pivotal axis of said radiator structure is vertically spaced below the pivotal axis of said operator's compartment.

6. In a cab-over-engine motor truck having a chassis frame, an engine mounted on the forward end of said frame, and a cab mounted on the forward end of said chassis frame for pivotal movement about a transversely extending axis between a normally lowered position and a raised forwardly tilted position, the combination including said chassis frame, engine and cab, comprising, a substantially rectangular radiator structure spaced forwardly of said engine; means for pivotally connecting said radiator structure to said chassis frame for pivotal movement between a normally upright position and a forwardly inclined position; and means operatively interconnecting said operator's compartment and said radiator structure for maintaining said radiator structure in its upright position when said operator's compartment is in its normally lowered position, said means effecting simultaneous pivotal movement of said radiator structure with respect to said chassis frame and operator's compartment when said operator's compartment is pivoted.

7. In a cab-over-engine motor truck having a longitudinally extending chassis frame, an engine mounted on the forward end of said chassis frame, and an operator's compartment mounted on the forward end of said chassis frame for pivotal movement about a transversely extending axis between a normally lowered position and a raised forwardly tilted position, said operator's compartment having a floor therein spaced vertically below the top of said engine when said operator's compartment is in its normally lowered position, the combination including said chassis frame, engine and operator's compartment, comprising a radiator structure spaced forwardly of said engine, the top of said radiator structure being vertically spaced above the top of said engine; means for pivotally connecting said radiator structure to said chassis frame for pivotal movement with respect to said chassis frame between a normally upright position and a forwardly inclined position; an engine enclosure within said operator's compartment overlying and covering the portions of the engine and radiator structure projecting above the level of the operator's compartment floor when the operator's compartment is in its normally lowered position; and means operatively interconnecting said operator's compartment and said radiator structure for maintaining said radiator structure in its normally upright position when said operator's compartment is in its normally lowered position, said means effecting simultaneous pivotal movement of said radiator structure with respect to said chassis frame and said operator's compartment when said operator's compartment is pivoted.

8. In a cab-over-engine motor truck substantially as set forth in claim 7, wherein the pivotal axis of said radiator structure is vertically spaced below the transverse pivotal axis of said operator's compartment, and the means operatively interconnecting said radiator structure and said operator's compartment is vertically spaced above the pivotal axis of said operator's compartment.

9. In a motor vehicle having a chassis frame, an engine mounted on the forward end of said frame, and an operator's compartment mounted on said frame for pivotal movement about a transversely extending horizontal axis between a normally lowered position and a forwardly raised position, said operator's compartment having a floor therein, the combination including said chassis frame, engine and operator's compartment, comprising, a radiator structure spaced forwardly of said engine, the top of said radiator structure being vertically spaced above the level of said floor when said operator's compartment is in its normally lowered position; means for pivotally connecting said radiator to said chassis frame; means operatively interconnecting said radiator to said operator's compartment whereby pivotal movement of said operator's compartment effects relative pivotal movement of said radiator structure with respect to said chassis frame and said operator's compartment; and an engine enclosure within and fixed to said operator's compartment overlying and covering the portion of said radiator structure projecting above the level of the operator's compartment floor when the operator's compartment is in its normally lowered position.

10. In a motor vehicle having a longitudinally extending chassis frame and an operator's compartment mounted on said chassis frame for pivotal movement about a transversely extending horizontal axis between a normally lowered position and a forwardly tilted position, said operator's compartment having a floor therein, the combination comprising said chassis frame and said operator's compartment, including, a radiator structure, said radiator structure having a portion thereof extending above the level of said floor when said operator's compartment is in its normally lowered position; a hood structure fixed to said operator's compartment floor overlying and covering the portion of said radiator structure extending above the level of the operator's compartment floor; means for pivotally connecting said radiator structure to said chassis frame for pivotal movement about a transversely extending axis with respect to said chassis frame between a normally upright position and a forwardly inclined position; a pivot pin projecting transversely outwardly from each transverse side of said radiator structure; a cylindrical roller journalled on each of said pivot pins; a pair of transversely spaced guide tracks fixed to said operator's compartment, each of said guide tracks having a respective roller received therein, said rollers being slidable with respect to said guide tracks when said operator's compartment is pivoted with respect to said chassis frame.

11. In a motor vehicle substantially as set forth in claim 10, in which, said guide tracks are vertically spaced above the pivotal axis of said operator's compartment and said pivotal axis of said radiator structure is vertically spaced below the pivotal axis of said operator's compartment.

12. In a motor vehicle substantially as set forth in claim 11, in which, each of said guide tracks includes a pair of spaced and parallel plates, said plates of each of said guide tracks being spaced a distance substantially equal to the diameter of said rollers.

References Cited in the file of this patent

UNITED STATES PATENTS

| | | |
|---|---|---|
| 939,961 | Enrico | Nov. 9, 1909 |
| 1,648,804 | Griese | Nov. 8, 1927 |
| 2,100,490 | Rippingille | Nov. 30, 1937 |
| 2,376,491 | Kinney | May 22, 1945 |